(12) United States Patent
Liu et al.

(10) Patent No.: US 10,493,425 B2
(45) Date of Patent: Dec. 3, 2019

(54) HOLLOW IRON-MANGANESE COMPOSITE MATERIAL PREPARED BY ETCHING TEMPLATE PROCESS AND APPLICATION THEREOF

(71) Applicant: Research Center for Eco-Environmental Sciences, Chinese Academy of Sciences, Beijing (CN)

(72) Inventors: Huijuan Liu, Beijing (CN); Gong Zhang, Beijing (CN); Hongwei Zhang, Beijing (CN); Huachun Lan, Beijing (CN); Ruiping Liu, Beijing (CN); Jiuhui Qu, Beijing (CN)

(73) Assignee: Research Center for Eco-Environmental Sciences, Chinese Academy of Sciences, Beijing (CN)

( * ) Notice: Subject to any disclaimer, the term of this patent is extended or adjusted under 35 U.S.C. 154(b) by 109 days.

(21) Appl. No.: 15/806,227

(22) Filed: Nov. 7, 2017

(65) Prior Publication Data
US 2018/0056268 A1  Mar. 1, 2018

Related U.S. Application Data

(63) Continuation of application No. PCT/CN2015/094351, filed on Nov. 11, 2015.

(30) Foreign Application Priority Data

Jun. 5, 2015 (CN) .......................... 2015 1 0305385

(51) Int. Cl.
*B01J 20/06* (2006.01)
*B01J 20/28* (2006.01)
(Continued)

(52) U.S. Cl.
CPC ......... *B01J 20/06* (2013.01); *B01J 20/28021* (2013.01); *B01J 20/3057* (2013.01);
(Continued)

(58) Field of Classification Search
CPC .................. B01J 20/06; B01J 20/28021; B01J 20/28061; B01J 20/3057; B01J 20/3085;
(Continued)

(56) References Cited

U.S. PATENT DOCUMENTS

2013/0000952 A1*  1/2013  Srinivas ................... H01B 1/02
                                                        174/126.1

FOREIGN PATENT DOCUMENTS

CN    102909031 A  *  2/2013
CN    102956359 A     3/2013
(Continued)

OTHER PUBLICATIONS

Synthesis-of-Hollow-Iron-Nanoframes (author: Dokyoon Kim).

*Primary Examiner* — James C Goloboy

(57) ABSTRACT

A method for preparing a hollow hydroxyl iron-manganese composite by employing a cubic structure template comprises: (1) preparation of a template: adding a certain mass of potassium permanganate to diluted hydrochloric acid, and dissolving and mixing evenly the same by magnetic stirring at room temperature; then adding polyvinylpyrrolidone thereto, and continuing to dissolve the same thoroughly by magnetic stirring; and finally adding a certain mass of potassium ferrocyanide and de-solubilizing the same for 10-60 minutes at room temperature, then transferring the above mixed solution into a sample bottle, and performing an isothermal reaction at 50-90° C. for 18-24 hours to obtain a blue-black deposit, namely a target iron-manganese composite template; and (2) preparation of a hollow iron-manganese composite: evenly dispersing the blue-black
(Continued)

iron-manganese composite template obtained in the step (1) to a small amount of anhydrous ethanol, then adding a certain concentration of sodium hydroxide solution thereto, placing the same on a rotary shaker to react at room temperature for 6-12 hours, and then removing a supernatant liquid, so that a black substance remaining at a bottom of a centrifuge tube is a hollow hydroxyl iron-manganese composite having a cubic structure. Also provided are a hollow hydroxyl iron-manganese composite prepared by the above method, and an application thereof to adsorption and removal of heavy metal in water.

13 Claims, 4 Drawing Sheets

(51) Int. Cl.
*B01J 20/30* (2006.01)
*C01G 49/00* (2006.01)
*C02F 1/28* (2006.01)
*C02F 101/10* (2006.01)
*C02F 101/20* (2006.01)

(52) U.S. Cl.
CPC ...... *B01J 20/3085* (2013.01); *C01G 49/0072* (2013.01); *C02F 1/288* (2013.01); *C01P 2002/82* (2013.01); *C01P 2002/85* (2013.01); *C01P 2004/03* (2013.01); *C01P 2004/04* (2013.01); *C02F 1/281* (2013.01); *C02F 2101/103* (2013.01); *C02F 2101/106* (2013.01); *C02F 2101/20* (2013.01)

(58) Field of Classification Search
CPC .... C02F 1/281; C02F 1/288; C02F 2101/103; C02F 2101/106; C02F 2101/20; C01P 2002/82; C01P 2002/85; C01P 2004/03; C01P 2004/04; C01P 2004/38; C01P 2006/12; C01G 49/0072
See application file for complete search history.

(56) References Cited

FOREIGN PATENT DOCUMENTS

| CN | 104190434 A | * | 12/2014 |
| CN | 104190434 A | | 12/2014 |
| CN | 201510305385.7 | | 11/2015 |
| EP | 2621862 A1 | | 8/2013 |
| WO | WO2005092492 A1 | | 10/2005 |

* cited by examiner

HOLLOW IRON-MANGANESE COMPOSITE MATERIAL PREPARED BY ETCHING TEMPLATE PROCESS AND APPLICATION THEREOF

TECHNICAL FIELD

The present disclosure belongs to the technical field of water body heavy metal ion removal, in particular to an iron-manganese composite with a cubic structure and its application for removing common high-toxicity heavy metals in a water body.

BACKGROUND ART

The shortage of water resource and water pollution in our nation has exerted great influence on the residential living quality and national economy. Wherein, the content of heavy metals in water exceeds standard significantly, which not only brings about threats to underground water and the utilization thereof but also brings about potential threats to the treatment and recycle of sewage water, which further limits the rapid development of the social economy. Arsenic, antimony and selenium as the common heavy metal in contaminated water, their contents in the waste water generated in industrial production and ore smelting process are high. Unreasonable disposal and discharge will not only pollute the surrounding drinking water, but also affect the health cycle of ecosystems through accumulation and enrichment of plants and animals.

At present, conventional purification techniques aiming at removing arsenic, antimony and selenium in water include absorption method, ion exchange method, coagulation sediment method, man-made moist land method and biological method and so on. However, by taking comprehensive consideration of industrial development demands, the absorption method becomes the most preferred method for this kind heavy metal removal and purification for it possesses multiple advantages such as being highly effective, low cost, stability, wild applicable conditions and being readily operative. Therefore, how to prepare absorption materials possessing big absorption capacity, excellent hot stability, short hydraulic retention time and wild applicable conditions orientates the absorption technology development in the present stage.

Iron-manganese composite widely exists in nature, which has relatively high specific surface area and surface electronegativity, is an adsorbent with excellent adsorption performance, and has a good development prospect in the adsorption purification of heavy metal in water. At present, the adsorption capacity of the iron-manganese composite oxide to arsenic, antimony and selenium in a water body are respectively 120 mg g$^{-1}$ (Gaosheng Zhang, Jiuhui Qu, Huijuan Liu, Ruiping Liu and Rongcheng Wu, Preparation and evaluation of a novel Fe–Mn binary oxide adsorbent for effective arsenite removal. *Water Research*, 2007, 9, 1921-1928), 168 mg g$^{-1}$ (Wei Xua, Hongjie Wang, Ruiping Liu, Xu Zhao, Jiuhui Qu, The mechanism of antimony(III) removal and its reactions on the surfaces of Fe—Mn Binary Oxide. *Journal of Colloid and Interface Science*, 2011, 1, 320-326), 41.02 mg g$^{-1}$ (Szlachta, M. and N. Chubar, The application of Fe—Mn hydrous oxides based adsorbent for removing selenium species from water. *Chemical Engineering Journal* 2013. 217, 159-168.).

Therefore, only in terms of the absorption performance of heavy metal substances such as arsenic, antimony, selenium and the like, the irregular iron-manganese composite oxide prepared by the traditional method has relatively good adsorption and removal capability on the above three heavy metals. However, there still has a large amount of defects and room for improvement, for example, the specific surface area is small, reactive site is few, and these defects greatly restrict the adsorption performance of the iron-manganese composite adsorption material. Therefore, the study to the structure of the iron-manganese composite material certainly will become the work focus, in order to improve the adsorption performance of the iron-manganese composite material to the maximum extent.

Hollow hydroxyl iron-manganese composite nano-mesoporous material with a cubic structure not only can fully utilize the active groups on the surface of the iron-manganese composite oxide, and also has good dispersibility in a water environment. And, the hollow structure provides a larger specific surface area, so that the active reaction sites of the materials can be more effectively contacted with target pollutants in the solution, then the materials are fully utilized to the maximum extent, and the adsorption performance of the adsorbent is improved.

SUMMARY OF THE INVENTION

In order to solve the above technical problems, the present disclosure aims at the concentration of heavy metals in the industrial drainage, adopts conventional heavy metals such as arsenic, antimony and selenium as the target pollutants, and prepares a hollow hydroxyl iron-manganese composite nanomaterial with a cubic structure based on the etching template process. The water quality of the water body after adsorption treatment is guaranteed while the treatment cost and the treatment difficulty of the water body are reduced.

In order to achieve the above-mentioned objects, the present disclosure provides a method for preparing a hollow hydroxyl iron-manganese composite by adopting a cubic structure template, comprising the following steps:

(1) preparation of a template: adding a certain mass of potassium permanganate to diluted hydrochloric acid and dissolving and mixing evenly the same by magnetic stirring at room temperature. Then, adding polyvinylpyrrolidone thereto, and continuing to dissolve the same thoroughly by magnetic stirring; and finally adding a certain mass of potassium ferrocyanide and de-solubilizing the same for 10-60 minutes at room temperature, then transferring the above mixed solution into a sample bottle, and performing an isothermal reaction at 50-90° C. for 18-24 hours to observe that the solution becomes blue-black, so that a blue-black deposit can be obtained, namely a target iron-manganese composite template.

The use amount of the potassium permanganate is 10~100 mg;

The volume of the diluted hydrochloric acid is 50 mL, and its concentration is 0.1 mol/L~1 mol/L;

The model of the polyvinylpyrrolidone is K30, and the use amount of polyvinylpyrrolidone is 0.5~4.0 g;

The use amount of potassium ferrocyanide is 0.1-0.2 g;

(2) preparation of a hollow iron-manganese composite: uniformly dispersing the blue-black iron-manganese composite template obtained in the step (1) to a small amount of absolute ethyl alcohol, and then adding a certain concentration of sodium hydroxide solution thereto, placing the same on a rotary shaker to react for 6-12 h at room temperature, and then removing a supernatant liquid, so that a black substance remaining at a bottom of a centrifuge tube is a hollow hydroxyl iron-manganese composite with a cubic structure;

The volume of the sodium hydroxide solution is 40 ml, and its concentration is 0.1 mol/L~0.5 mol/L.

The disclosure also provides a hollow hydroxyl iron-manganese composite prepared by above method, and an application of the iron-manganese composite in adsorption and removal for the heavy metals in the water body.

The present disclosure has the beneficial effects:

1) The invention adopts a simple template process to prepare the iron-manganese composite with a cubic structure for the first time. First, the introduction of polyvinylpyrrolidone in the preparation process weakens the strong oxidizing ability of potassium permanganate, three dimensional cube morphology of the iron-manganese composite is preserved; secondly, this weakening makes the more oxidized trivalent manganese ions massively present in the surface of the composite, so that the removal mechanism of the iron-manganese composite oxide that oxidation first and then adsorption can be embodied on the material to a greater extent.

2) The specific surface area of the iron-manganese composite prepared by the method disclosed by the invention reaches 472.3 $m^2$ $g^{-1}$, and the adsorption rate is relatively high, and the concentration of the two kinds of heavy metals such as antimony and selenium can be reduced to be lower than the concentration limit value within 1 min, and the concentration of arsenic in the water body can be reduced to be below the standard concentration limit within 10 min. The adsorption rate of heavy metal antimony and selenium is far higher than that of other composite adsorption materials, and the adsorption effect of the adsorbent is stable; compared with other treatment modes, the method has the advantages that the reaction time and the treatment cost are shortened.

DETAILED DESCRIPTION

Example 1: A Preparation Method of a Hollow Iron-Manganese Composite

1. Preparation of the Iron-Manganese Composite Template

Under the condition of room temperature, 40 mg of potassium permanganate is added into 50 mL of 1 mol/L diluted hydrochloric acid, and is dissolved and uniformly mixed by magnetic stirring; and then 3.8 g of polyvinylpyrrolidone K30 is added thereto, and fully dissolved under the action of magnetic stirring; finally, 110 mg of potassium ferrocyanide is added, and reverse dissolution is carried out at normal temperature for 30 min. After this, the mixed solution is transferred to a thermostatic reaction at 80° C. for 24 h to observe that the solution becomes blue-black. The turbid liquid obtained after the thermostatic reaction is transferred to a centrifugal tube, centrifuging at the rotating speed of 7500 r $min^{-1}$ for 15 min to obtain blue-black sediment, namely the iron-manganese composite template.

2. Preparation of the Hollow Iron-Manganese Composite

The obtained blue-black sediment is cleaned by using ultrapure water and absolute ethyl alcohol for several times, centrifuging at the condition of 7500 rpm for 15 min, and pouring out the supernatant. Then, 10 mL of absolute ethyl alcohol is added to the sediment, and the mixture is uniformly dispersed by ultrasonic. Afterwards, 40 mL of sodium hydroxide solution with the concentration of 0.1 mol/L is added thereto, and placed on a rotary shaker for thermostatic reaction for 12 h at normal temperature. Then centrifugation is carried out at the condition of 7500 rpm for 15 min. Removing the supernatant liquid, the substance remaining at the bottom of the centrifuge tube is a hollow hydroxyl iron-manganese composite with a cubic structure.

Figure 1:
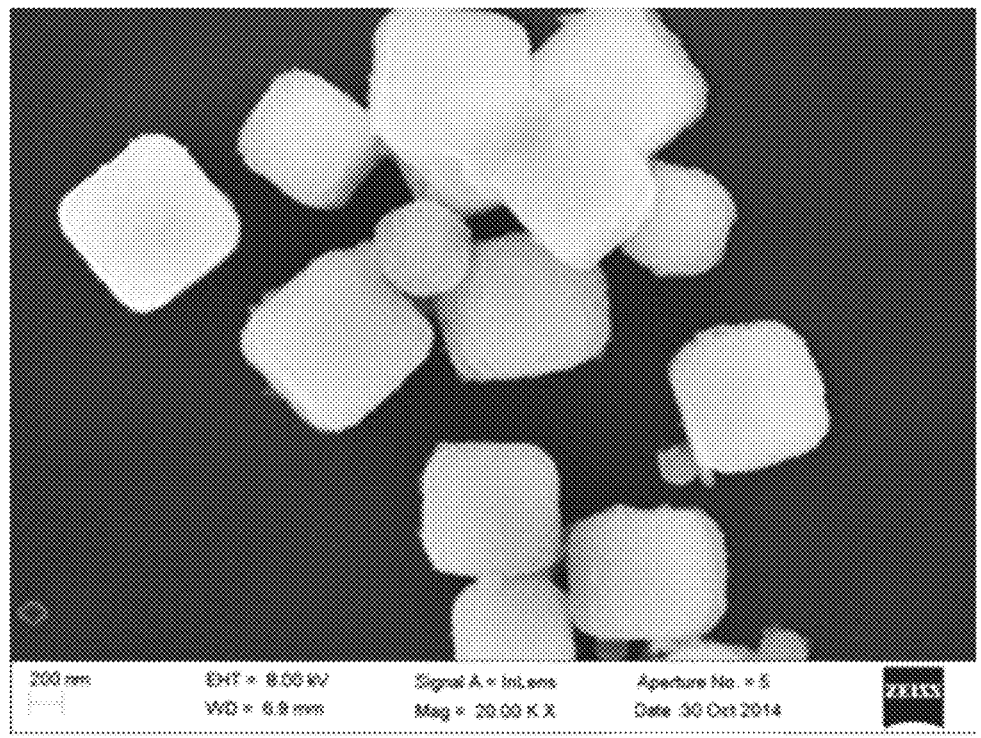
FIG. 1 is a SEM image of a hollow iron-manganese composite.

FIG. 1 is an electron microscope picture of a cage-like iron-manganese composite prepared according to example 1. The prepared iron-manganese composite can be clearly observed to be in a cubic shape, loose in arrangement, fluffy and uniform in surface and relatively good in dispersion degree.

Figure 2:
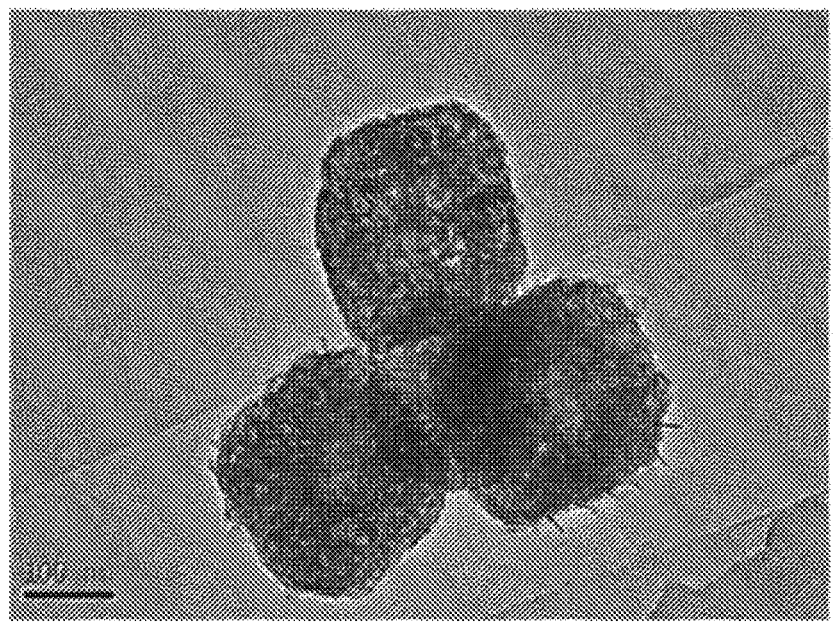
FIG. 2 is a transmission electron microscope (TEM) image of a hollow iron-manganese composite.

FIG. 2 is a transmission electron microscope picture of the cage-like iron-manganese composite. The composite can be seen to be of a loose and hollow structure on microscopic level, the specific surface area of the material can be increased by the hollow nano-particle structure, which is favor of the adsorption of pollutants.

Figure 3:
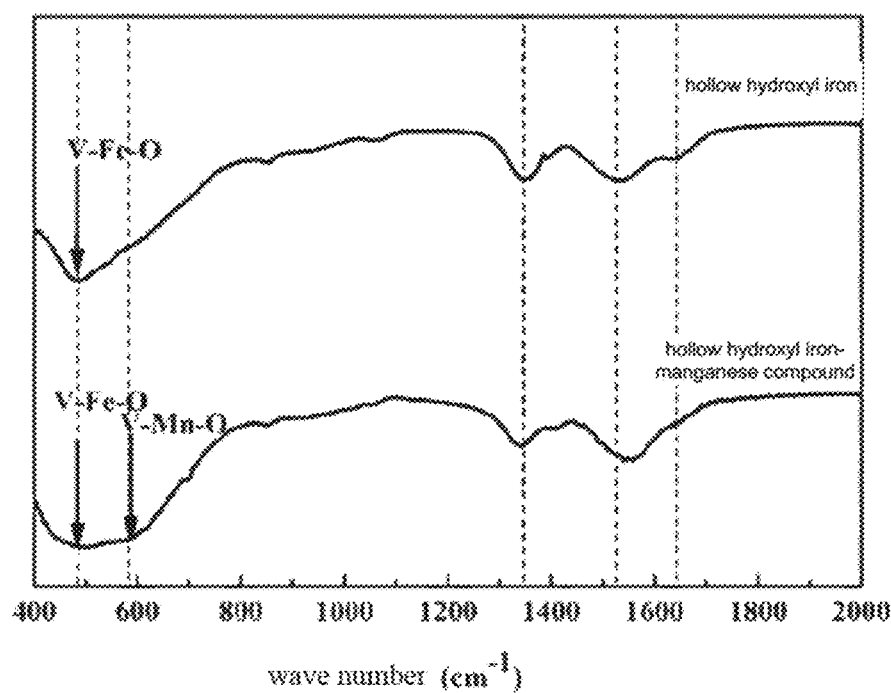
FIG. 3 is an infrared spectrogram of a hollow hydroxyl iron-manganese composite.

FIG. 3 is an infrared spectrum determination result of a hollow iron-manganese composite. As can be seen from the figure, the infrared spectrum of the comparison hydroxyl iron is known, the hollow hydroxyl iron-manganese composite also has a hydroxyl absorption peak (a hydroxyl absorption peak appears at 1390 $cm^{-1}$ and 1638 $cm^{-1}$), and the absorption peaks of the hydroxyl group are generated by bending vibration of a hydroxyl group combined with iron and manganese. Between 400 $cm^{-1}$ and 650 $cm^{-1}$, absorption peaks of the iron-oxygen and the manganese-oxygen are generated. Due to the fact that the positions of the absorption peaks of the iron oxygen and the manganese oxygen are relatively close, the peak value is overlapped. It is further confirmed that, the prepared material is an iron-manganese composite.

Figure 4:
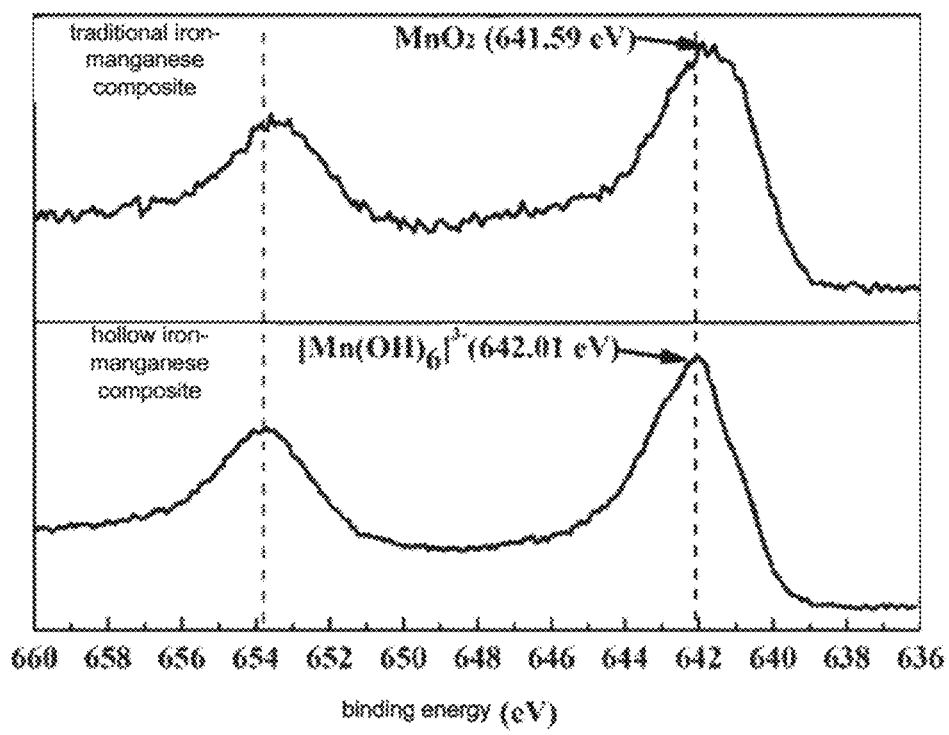
FIG. 4 is a Mn-valence-state XPS analysis result of the surface of a hollow hydroxyl iron-manganese composite.

FIG. 4 is an XPS detection result of the prepared hollow hydroxyl iron manganese composite. Compared with the tetravalent manganese in the traditional iron-manganese oxide, the manganese in the novel hollow iron-manganese composite exists in a trivalent manganese form. Compared with manganese dioxide, the transition-state trivalent manganese has a stronger oxidation activity, so that the removal mechanism of adsorption after oxidation of the iron-manganese composite is exerted to a great extent.

Figure 5:
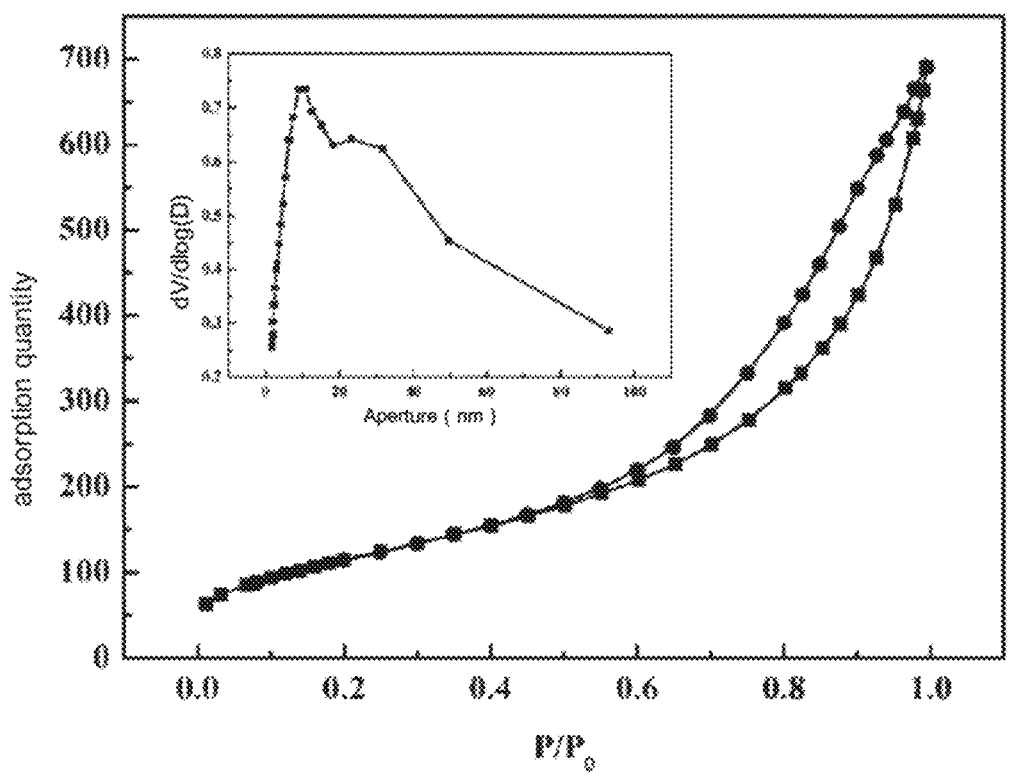
FIG. 5 is a specific surface area measuring result of a hollow hydroxyl iron-manganese composite.

FIG. 5 is a determination result of specific surface area and porosity of an adsorption material. The specific surface area is a very important factor affecting adsorption performance of adsorption materials. According to the BET determination result, the specific surface area of the material according to the disclosure is 472.3 $m^2$ $g^{-1}$, the specific surface area of the traditional iron-manganese oxide is about 231 m² g⁻¹ (Gaosheng Zhang, Jiuhui Qu, Huijuan Liu, Ruiping Liu and Rongcheng Wu, Preparation and evaluation of a novel Fe—Mn binary oxide adsorbent for effective arsenite removal. *Water Research*, 2007, 9, 1921-1928), the material prepared by the research institute has a larger specific surface area. The aperture of the material is intensively distributed between 0-100 nm, and mainly composed of mesopores and macropores.

Figure 6:
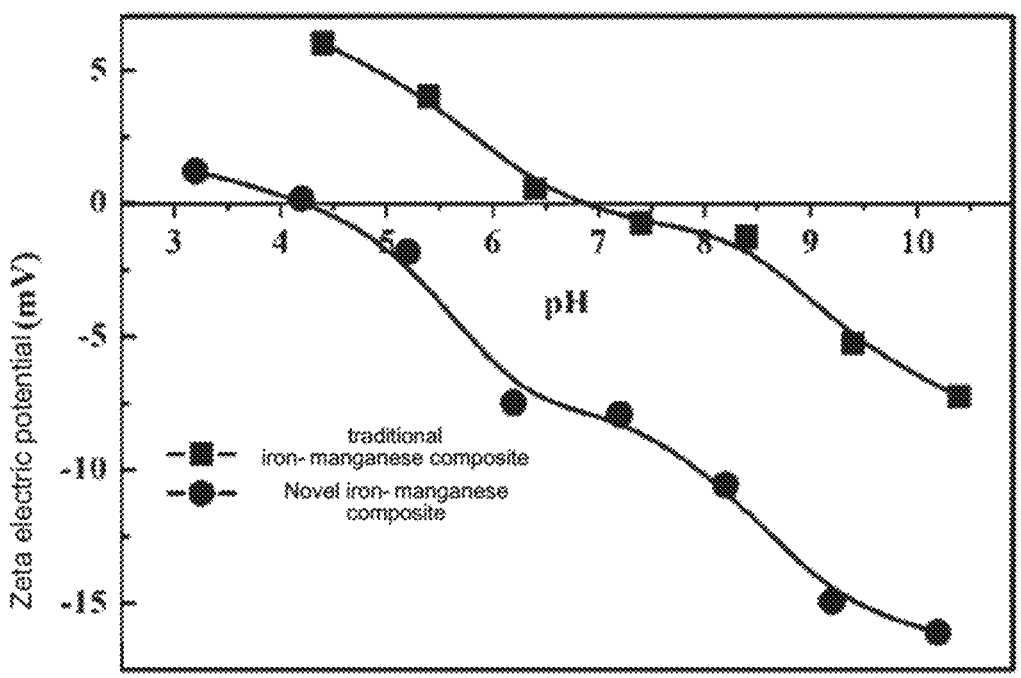
FIG. 6 is a surface electrical analysis result of a hollow hydroxyl iron-manganese composite.

FIG. 6 is a measurement result of the surface electrical property of the material. It can be seen from the measurement result, the isoelectric point of the surface of the hollow hydroxyl iron-manganese composite is in the range of pH=4.3. Compared with the traditional iron-manganese oxide having a relatively high isoelectric point (generally nearby pH=7.5), the isoelectric point of the hollow hydroxyl iron-manganese composite provides a good foundation for adsorbing arsenate and selenate.

Example 2

1. Preparation of the Iron-Manganese Composite Template

Under the room temperature condition, 30 mg of potassium permanganate is added into 50 mL of 0.2 mol/L diluted hydrochloric acid, and is dissolved and uniformly mixed by magnetic stirring; and then 3.0 g of polyvinylpyrrolidone K30 is added thereto, and fully dissolved under the action of magnetic stirring; finally, 130 mg of potassium ferrocyanide is added, and reverse dissolution is carried out at normal temperature for 40 min. After this, the mixed solution is transferred to a thermostatic reaction at 60° C. for 18 h to observe that the solution becomes blue-black. The turbid liquid obtained after the thermostatic reaction is transferred to a centrifugal tube, centrifuging at the rotating speed of 7500 r min⁻¹ for 15 min to obtain blue-black sediment, namely the iron-manganese composite template.

2. Preparation of the Hollow Iron-Manganese Composite

The obtained blue-black sediment is cleaned by using ultrapure water and absolute ethyl alcohol for several times, centrifuging at the condition of 7500 rpm for 15 min, and pouring out the supernatant. Then, 10 mL of absolute ethyl alcohol is added to the sediment, and the mixture was uniformly dispersed by ultrasonic. Afterwards, 40 mL of sodium hydroxide solution with the concentration of 0.2 mol/L is added thereto, and placed on a rotary shaker for thermostatic reaction for 12 h at normal temperature. Then centrifugation is carried out at the condition of 7500 rpm for 15 min. Removing the supernatant, the substance remaining at the bottom of the centrifuge tube is a hollow hydroxyl iron-manganese composite with a cubic structure.

Example 3

1. Preparation of the Iron-Manganese Composite Template

Under the room temperature condition, 50 mg of potassium permanganate is added into 50 mL of 0.15 mol/L diluted hydrochloric acid, and is dissolved and uniformly mixed by magnetic stirring; and then 2.5 g of polyvinylpyrrolidone K30 is added thereto, and fully dissolved under the action of magnetic stirring; finally, 150 mg of potassium ferrocyanide, is added and reverse dissolution is carried out at normal temperature for 20 minutes, after this, the mixed solution is transferred to a thermostatic reaction at 70° C. for 20 hours to observe that the solution becomes blue-black. The turbid liquid obtained after the thermostatic reaction is transferred to a centrifugal tube, centrifuging at the rotating speed of 7500 r min⁻¹ for 15 min to obtain blue-black sediment, namely the iron-manganese composite template.

2. Preparation of the Hollow Iron-Manganese Composite

The obtained blue-black sediment is cleaned by using ultrapure water and absolute ethyl alcohol for several times, centrifuging at the condition of 7500 rpm for 15 minutes, and pouring out the supernatant. Then, 10 mL of absolute ethyl alcohol is added to the sediment, and the mixture was uniformly dispersed by ultrasonic. Afterwards, 40 mL of sodium hydroxide solution with the concentration of 0.3 mol/L is added thereto, and placed on a rotary shaking bed for thermostatic reaction for 12 h at normal temperature. Then centrifugation is carried out at the condition of 7500 rpm for 15 min. Removing the supernatant, the substance remaining at the bottom of the centrifuge tube is a hollow hydroxyl iron-manganese composite with a cubic structure.

Example 4: Adsorption Purification Method for Heavy Metals in Water by Using the Hollow Iron-Manganese Composite as Adsorption Material The sewage respectively containing 1 mg L⁻¹ low-concentration arsenic, antimony and selenium are used for simulating the actual heavy metal polluted water body. The hydroxyl iron-iron-manganese composites prepared in example 1 are added into the polluted water body. The pH value (6.0, 7.0) of the solution is adjusted with diluted hydrochloric acid and diluted sodium hydroxide. With the reaction, a certain amount of mixed solution is sucked by a syringe at intervals of 0.5 min, and is filtered by a 0.22 μm filter membrane to determine the concentration of the residual heavy metal ions in the clear solution. Then, the heavy metal ion amount removed by adsorption can be obtained through inverse derivation.

Figure 7:
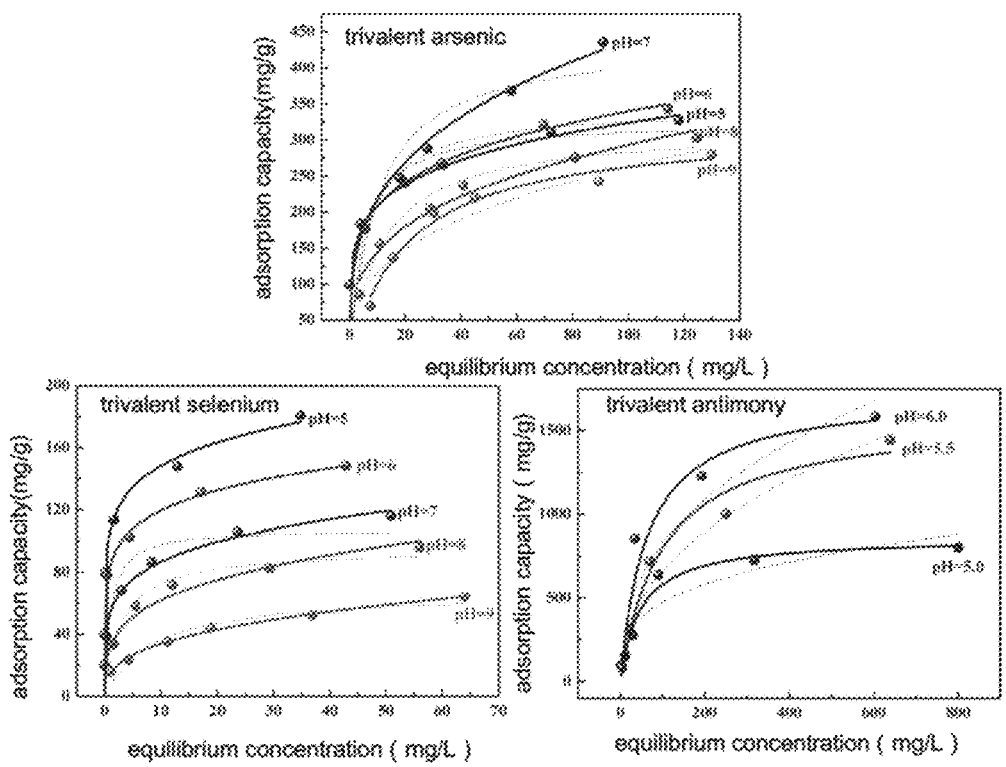
FIG. 7 is a determination result of adsorption capacity of a hollow hydroxyl iron-manganese composite to arsenic, antimony and selenium, wherein the solid line represents a Freundlich adsorption model, and the dotted line represents a Langmuir adsorption model.

FIG. 7 shows the adsorption result of the hollow hydroxyl iron-manganese composite material prepared according to example 1 for arsenic, antimony and selenium with a concentration of 1 mg L⁻¹ respectively. In order to determine the adsorption performance of the prepared hydroxyl iron material for arsenic, antimony and selenium, under the condition that the dosage is 0.25 g L⁻¹, the influences of the initial concentration of the solution and the initial pH value of the solution on the adsorption performance are shown in the figure. As can be seen from experimental results with different initial pH values, the weak acid condition is beneficial to adsorption of arsenic, antimony and selenium. From the fitting results of Freundlich (solid line) and Langmuir (dotted lines)) adsorption models, the Freundlich model better conforms to the practical process of adsorption, so that the adsorption of the hydroxyl iron to arsenic, antimony and selenium is more similar to the chemical adsorption process of the multi-molecular layer. Under the condition of saturated adsorption, an adsorption result is fitted by adopting a Langmuir curve. The fitting result is displayed, under the condition that the pH value is 7, the maximum adsorption amount of As(III) can reach 450 mg g⁻¹; under the condition that the pH is equal to 6, the saturation adsorption amount of Sb(III) is up to 1884 mg g⁻¹; under the condition that the pH is equal to 5, the adsorption capacity of Se (IV) can reach 168 mg g⁻¹.

Figure 8:
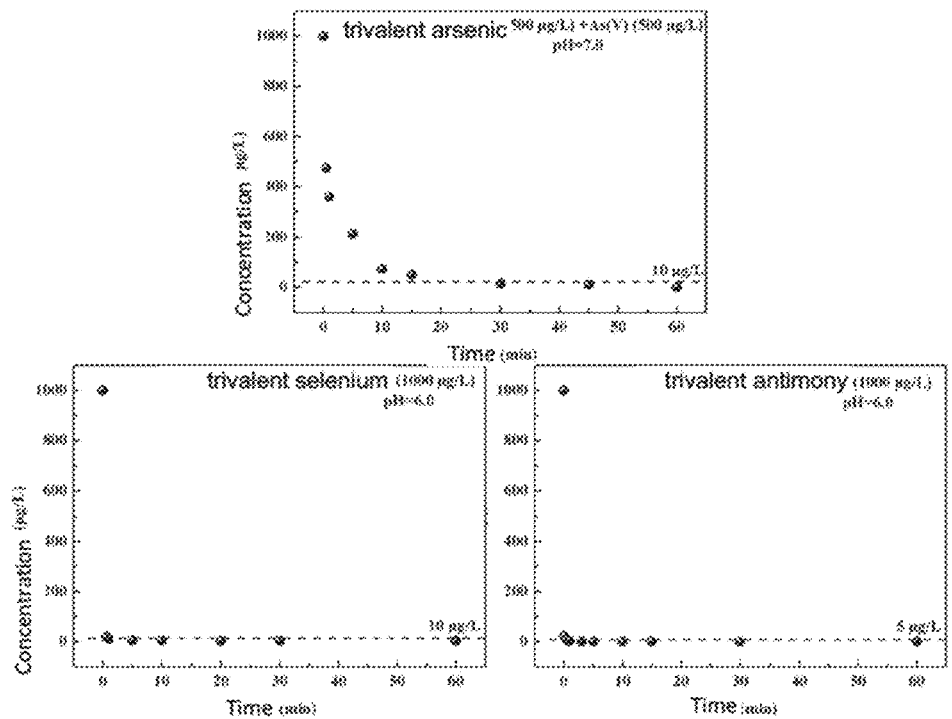
FIG. 8 is a research result of the adsorption kinetics of the hollow hydroxyl iron-manganese composite on arsenic, antimony and selenium.

As can be seen from FIG. 8, the novel iron-manganese composite can rapidly adsorb arsenic, antimony and selenium under neutral conditions, and the remaining amount of the three heavy metals in the water body is reduced to lower than the concentration limit specified in "domestic drinking water quality standard" (GB5749-2006). The concentration of the two kinds of heavy metals antimony and selenium can be reduced to be below the concentration limit within 1 min, and the residual concentration of arsenic in the water body can be reduced to be below the standard concentration limit value in 10 min. The adsorption rates of the three heavy metal substances such as arsenic, antimony and selenium are relatively high, and the water body polluted by arsenic, antimony and selenium can be rapidly purified in practical application.

Compared with the adsorption effect of an existing adsorbent, the adsorption effect of the hollow hydroxyl iron-manganese composite material prepared by the method disclosed by the invention is more excellent in the adsorption of heavy metals arsenic, antimony and selenium in water. The main reason is that, firstly, the presence of transition-state trivalent manganese provides the oxidation guarantee for the adsorption; secondly, the three-dimensional cube structure increases the stability and the dispersibility of the material, so that the material makes full contact with the target pollutants; finally, the hollow hydroxyl composite material has a relatively large specific surface area, and the probability of contact with ions in the solution is increased, the amount of reaction sites for the target pollutants is increased, which are favor of adsorption reaction. The hollow hydroxyl iron-manganese composite material is used for removing arsenic, antimony and selenium in a polluted water body, the adsorption rate is rapid and adsorption capacity is relatively large, and the preparation process of the material is simple without high-temperature, high-pressure and other preparation conditions. And low cost of raw materials, well dispersibility in water and well mechanical property, provide a good foundation for industrial wide application.

What is claimed is:

1. A method for preparing a hollow hydroxyl iron-manganese composite by adopting a cubic structure template, wherein, comprising the following steps: (1) preparation of a template:

adding a potassium permanganate to diluted hydrochloric acid, and dissolving and mixing evenly the same by magnetic stirring at room temperature; then adding polyvinylpyrrolidone thereto, and continuing to dissolve the same thoroughly by magnetic stirring; and finally adding a potassium ferrocyanide and de-solubilizing the same for 10-60 minutes at room temperature, then transferring the above mixed solution into a sample bottle, and performing an isothermal reaction at 50-90° C. for 18-24 hours to observe that the solution becomes blue-black, so that a blue-black deposit is obtained, namely a target iron-manganese composite template;

(2) preparation of a hollow iron-manganese composite:

evenly dispersing the blue-black iron-manganese composite template obtained in the step (1) in a centrifuge tube to a small amount of anhydrous ethanol, then adding a diluted sodium hydroxide solution thereto, placing the same on a rotary shaker to react at room temperature for 6-12 hours, and then removing a supernatant liquid, leaving a black substance at the bottom of the centrifuge tube, wherein the black substance is a hollow hydroxyl iron-manganese composite having a cubic structure.

2. The method for preparing a hollow hydroxyl iron-manganese composite by adopting a cubic structure template according to claim 1, wherein, the use amount of the potassium permanganate is 10-100 mg.

3. The method for preparing hollow hydroxyl iron-manganese composite by adopting a cubic structure template according to claim 1, wherein the volume of the diluted hydrochloric acid is 50 ml, and its concentration is 0.1 mol/L-1 mol/L.

4. The method for preparing the hollow hydroxyl iron-manganese composite by adopting a cubic structure template according to claim 1, wherein the use amount of the polyvinylpyrrolidone is 0.5-4.0 g.

5. The method for preparing the hollow hydroxyl iron-manganese composite by adopting a cubic structure template according to claim 1, wherein, the use amount of the potassium ferrocyanide is 0.1-0.2 g.

6. The method for preparing hollow hydroxyl iron-manganese composite by adopting a cubic structure template according to claim 1, wherein, the volume of the sodium hydroxide solution is 40 ml and its concentration is 0.1 mol/L-0.5 mol/L.

7. A hollow hydroxyl iron-manganese composite prepared by the method according to claim 1.

8. A method of using the hollow hydroxyl iron-manganese composite according to claim 7 in treating heavy metal pollution, comprising adding the hollow hydroxyl iron-manganese composite to a polluted water body and adjusting the pH to neutral.

9. The hollow hydroxyl iron-manganese composite according to claim 7, wherein, the amount of potassium permanganate used in preparing the hollow hydroxyl iron-manganese composite is 10-100 mg is 10-100 mg.

10. The hollow hydroxyl iron-manganese composite according to claim 7, wherein the volume of the diluted hydrochloric acid used in preparing the hollow hydroxyl iron-manganese composite is 50 ml, and its concentration is 0.1 mol/L-1 mol/L.

11. The hollow hydroxyl iron-manganese composite according to claim 7, wherein the amount of polyvinylpyrrolidone used in preparing the hollow hydroxyl iron-manganese composite is 0.5-4.0 g is 0.5-4.0 g.

12. The hollow hydroxyl iron-manganese composite according to claim 7, wherein, the amount of potassium ferrocyanide used in preparing the hollow hydroxyl iron-manganese composite is 0.1-0.2 g is 0.1-0.2 g.

13. The hollow hydroxyl iron-manganese composite according to claim 7, wherein, the volume of the sodium hydroxide solution used in preparing the hollow hydroxyl iron-manganese composite is 40 ml and its concentration is 0.1 mol/L-0.5 mol/L.

* * * * *